O. J. GRUNDY.
MANURE SPREADER.
APPLICATION FILED OCT. 21, 1908.
921,103.
Patented May 11, 1909.
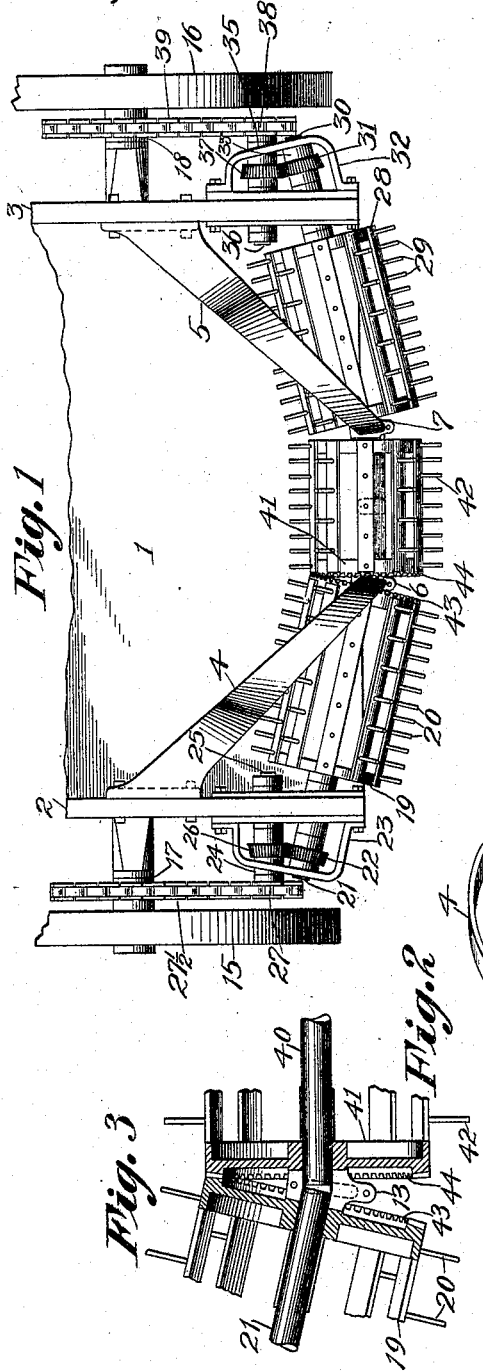
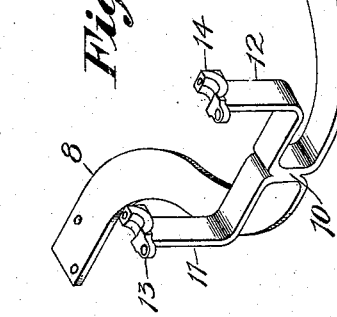
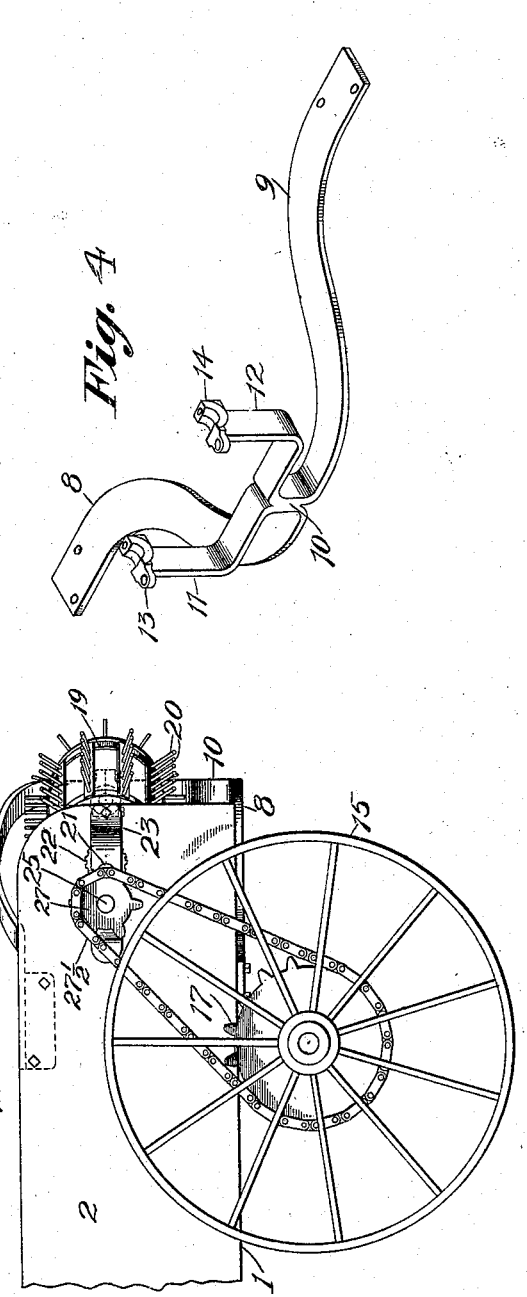
Witnesses:
C. E. Bridg
E. Behel.
Inventor:
Oliver J. Grundy,
by A. O. Behel
Attorney

UNITED STATES PATENT OFFICE.

OLIVER J. GRUNDY, OF MILAN TOWNSHIP, DEKALB COUNTY, ILLINOIS.

MANURE-SPREADER.

No. 921,103.      Specification of Letters Patent.      Patented May 11, 1909.

Application filed October 21, 1908. Serial No. 458,868.

*To all whom it may concern:*

Be it known that I, OLIVER J. GRUNDY, a citizen of the United States, residing at Milan township, in the county of Dekalb and State of Illinois, have invented certain new and useful Improvements in Manure-Spreaders, of which the following is a specification.

The object of this invention is to construct a manure spreader which will distribute the manure evenly over the area between the supporting wheels and for some distance beyond the wheels.

In the accompanying drawings, Figure 1 is a plan view of the delivery end of a manure spreader showing my improvements. Fig. 2 is a side elevation of the delivery end. Fig. a is a horizontal section showing the gage connection between the center head section and one of the end head sections. Fig. 4 is an isometrical representation of the lower support for the head sections.

The box of the manure spreader comprises the movable bottom 1 and sides 2 and 3. To the side 2 is secured a bracket 4, and to the side 3 is secured a bracket 5. The free rear ends of the brackets are in the form of the upper half of a box 6 and 7 respectively.

To the underface of the bottom 1 are secured the branches 8 and 9 of a bracket which has its center portion 10 elevated and terminating in branches 11 and 12, the upper ends of which are each formed with the lower half of a box or bearing 13 and 14 respectively.

Wheels 15 and 16 support the box of the spreader, and each has a sprocket wheel 17 and 18 respectively connected to the hub thereof.

A distributing head 19 is provided with teeth 20 in its periphery and is secured to the shaft 21 having one end supported in the box composed of the sections 6 and 13 and its other end extends through the side 2 of the wagon box, and to its projecting end is secured a bevel gear 22. A bracket 23 is secured to the outer face of the side 2 of the wagon box and is formed with a bearing 24 for a short shaft 25. To this short shaft 25 is fixedly connected a bevel gear 26, also a sprocket wheel 27. This bevel gear 26 meshes with the bevel gear 22 on the shaft 21 of the head 19. A chain 27½ connects the sprocket wheels 17 and 27.

A distributing head 28 is provided with teeth 29 in its periphery and is secured to a shaft 30 having one end supported in the box comprising the section 7 and 14, and its end extends through the side 3 of the wagon box, and to its projecting end is secured a bevel gear 31. A bracket 32 is secured to the outer face of the side 3 of the wagon box and is formed with a bearing 33 for the end of the shaft 34, also with a bearing 35 for a short shaft 36. To this short shaft 36 is fixedly connected a bevel gear 37, also a sprocket wheel 38. The bevel gear 37 meshes with the bevel gear 31 on the shaft 30 of the head 28. A chain 39 connects the sprocket wheels 18 and 38.

The distributing heads 19 and 28 are located diagonally across the bottom of the box and obliquely with respect to one another so that each will distribute the manure beyond the outside of the supporting wheels.

A shaft 40 is supported in boxes comprising the sections 6 and 13 and the sections 7 and 14 and has its ends located adjacent to the inner ends of the shafts 21 and 30 of the distributing heads. A distributing head 41 is fixedly connected to the shaft 40 and is provided with teeth 42 in its periphery. The meeting ends of the distributing heads 19 and 41 are formed with gear teeth 43 and 44 respectively and which mesh.

The rotations of the distributing head 19 will, through the bevel gears 43 and 44 impart a rotary movement to the distributing head 41 in the same direction. This distributing head 41 standing at right angles to the length of the wagon box, will throw the manure rearward which in connection with the distributing heads 19 and 28 cover the entire surface between the supporting wheels and to some distance outside of the supporting wheels. I have not formed a driving connection between the distributing heads 28 and 41 which will leave the supporting wheels free to move independently of each other thereby preventing breakage of the parts.

I claim as my invention.

A manure spreader comprising a box, supporting wheels for the box, two distributing heads located at an angle to one another and located diagonally with respect to the length of the box, a shaft fixedly connected to each head, another shaft, a cutter head supported by this shaft and located between the other heads and at right angles to the length of the box, bearings for the ends of the shafts, a driving connection between the two supporting wheels and the two diagonally arranged shafts, and a gear connection between one of the diagonally arranged heads and the center head.

In testimony whereof I have hereunto set my hand in presence of two subscribing witnesses.

OLIVER J. GRUNDY.

Witnesses:
 S. M. MAAKESTAD,
 LEWIS O. LARSON